United States Patent
Weiss et al.

(10) Patent No.: US 8,181,672 B2
(45) Date of Patent: May 22, 2012

(54) SPIRAL-WOUND DIAPHRAGM BELLOWS, AND METHOD OF MAKING SUCH A DIAPHRAGM BELLOWS

(75) Inventors: Matthias Weiss, Hilchenbach (DE); Karl-Heinz Münker, Hilchenbach (DE); Dietmar Baumhoff, Olpe (DE); Oliver Selter, Lennestadt (DE); Stefan Hauk, Hilchenbach (DE); Andreas Gerhard, Wenden (DE); Karsten Schenk, Schwalmstadt (DE)

(73) Assignee: Westfalia Metallschlauchtechnik GmbH & Co. KG, Hilchenbach (DE)

( * ) Notice: Subject to any disclaimer, the term of this patent is extended or adjusted under 35 U.S.C. 154(b) by 1024 days.

(21) Appl. No.: 12/110,726

(22) Filed: Apr. 28, 2008

(65) Prior Publication Data
US 2008/0264509 A1    Oct. 30, 2008

(30) Foreign Application Priority Data

Apr. 27, 2007   (DE) .................. 10 2007 020 452

(51) Int. Cl.
*F16L 11/00* (2006.01)
(52) U.S. Cl. ........................ 138/121; 138/122
(58) Field of Classification Search .............. 138/121, 138/122, 155, 120; 277/634
See application file for complete search history.

(56) References Cited

U.S. PATENT DOCUMENTS

| | | | |
|---|---|---|---|
| 1,372,835 A | | 3/1921 | Schröder |
| 3,326,091 A | * | 6/1967 | Allen ................................ 92/34 |
| 4,509,560 A | | 4/1985 | Schafer ......................... 138/122 |
| 5,924,697 A | * | 7/1999 | Parker et al. ................... 277/369 |
| 6,098,663 A | * | 8/2000 | Larsen ............................ 138/30 |
| 6,852,035 B2 | * | 2/2005 | Tsugane et al. ................ 464/79 |
| 7,556,065 B2 | * | 7/2009 | Koizumi ....................... 138/121 |
| 7,756,065 B2 | * | 7/2010 | Chung et al. .................. 370/255 |
| 2002/0175480 A1 | | 11/2002 | Tatzreiter ...................... 277/634 |
| 2005/0194746 A1 | * | 9/2005 | Grace ........................... 277/358 |

FOREIGN PATENT DOCUMENTS

| | | |
|---|---|---|
| AU | 68 334/65 A | 6/1967 |
| DE | 237250 | 8/1911 |
| DE | 861 732 B | 1/1953 |
| DE | 1 287 545 A | 1/1969 |
| DE | 1 503 436 A | 9/1969 |
| DE | 44 11 246 A1 | 10/1995 |
| EP | 1 241 388 B1 | 5/2005 |
| FR | 1 038 160 A | 9/1953 |
| FR | 2 237 695 | 2/1975 |
| GB | 907 095 A | 10/1962 |
| JP | 63006269 | 1/1988 |

* cited by examiner

*Primary Examiner* — Patrick F Brinson
(74) *Attorney, Agent, or Firm* — Henry M. Feiereisen; Ursula B. Day

(57) ABSTRACT

A diaphragm bellows includes a spiral-wound, pre-profiled metal strip having neighboring turns which are connected by a continuous welding seam in an area of an outer diameter or inner diameter of the metal strip. Neighboring flanks of the metal strip enter a region of the welding seam at an angle of less than 60°.

17 Claims, 4 Drawing Sheets

SPIRAL-WOUND DIAPHRAGM BELLOWS, AND METHOD OF MAKING SUCH A DIAPHRAGM BELLOWS

CROSS-REFERENCES TO RELATED APPLICATIONS

This application claims the priority of German Patent Application, Serial No. 10 2007 020 452.5, filed Apr. 27, 2007, pursuant to 35 U.S.C. 119(a)-(d), the content of which is incorporated herein by reference in its entirety as if fully set forth herein.

BACKGROUND OF THE INVENTION

The present invention relates in general to a diaphragm bellows.

Nothing in the following discussion of the state of the art is to be construed as an admission of prior art.

A diaphragm bellows of a type involved here is used, for example, in vacuum systems for compensating movements of pipe elements or valve movements to prevent leaks, or for applications in measurement instruments to ascertain state variables such as pressure, temperature, throughput, and flow rate. Diaphragm bellows have small spring stiffness and thus a high mobility and can be compressed axially until all corrugations come into full metallic contact and become immobile. Normally, the diaphragm bellows can be compressed axially over a large proportion of the entire operating path (up to 80%) between relaxed center position and compressed blockage.

German Pat. No. 861732 B describes a bellows made of corrugated diaphragm disks, wherein the inner and outer edges are alternately soldered or welded together. A similar diaphragm bellows, comprised of ring-shaped metal sheets, is described in German Offenlegungsschrift DE 1503436 A.

Common to all prior art diaphragm bellows is the need for a welding operation, e.g. by burners, between neighboring diaphragm disks at their smallest and greatest diameter. In general, the manufacture of diaphragm bellows is complicated because diaphragm disks and burner must be repositioned after each completed circumferential welding seam. The welding seams are arranged on a plane which extends orthogonally in relation to the rotation axis and there is no connection between the welding seams.

It would be desirable and advantageous to address prior art shortcomings.

SUMMARY OF THE INVENTION

According to one aspect of the present invention, a diaphragm bellows includes a spiral-wound profiled metal strip having neighboring turns connected by a continuous welding seam in an area of an outer diameter or inner diameter of the metal strip, wherein neighboring flanks of the metal strip, as viewed in radial running direction, enter a region of the welding seam at an angle of less than 60°.

According to another feature of the present invention, the angle may be less than 45. Currently preferred is an angle of less than 30°. The angle is hereby measured between the flanks of the turns, when the diaphragm bellows is relaxed and thus not subjected to any force. Neighboring flanks of the wound metal strip suitably define a relatively small angle in proximity of the interconnecting welding seam so that the flanks extend substantially parallel to one another. In this way, neighboring flanks closely approach one another, when the diaphragm bellows is compressed, and may even touch one another so that the volume defined between the turns of the diaphragm bellows almost decreases to zero.

According to another feature of the present invention, the welding seam may be radially spaced in midsection at a distance of at least about 0.5 mm from the outer diameter or inner diameter. Currently preferred is a distance of 1 mm. The combination of the spaced disposition of the welding seam with the parallel abutment of neighboring flanks of the metal strip in this region results again in an angle between the flanks in the area of the welding seam, which angle is significantly less than 90°.

According to another aspect of the present invention, a diaphragm bellows includes a spiral-wound profiled metal strip having neighboring turns connected by a continuous welding seam in an area of an outer diameter or inner diameter of the metal strip, wherein the welding seam is radially spaced in midsection at a distance of at least about 0.5 mm from the outer diameter or inner diameter. Currently preferred is a distance of 1 mm. In the event the welding seam is in the area of the outer diameter, the indicated minimum distance from the inner diameter is, of course, predefined, and vice versa. Suitably, the radial position of the welding seam can hereby vary without breaching the seam. As a result, great diaphragm bellows lengths can be continuously manufactured, the need for complex alternating positioning works is prevented, and the welding seam length is significantly reduced.

Although the welding seam can normally be located on the outer diameter or inner diameter, the disposition on the outer diameter is currently preferred as the outer diameter is more accessible.

According to another feature of the present invention, the continuous welding seam may be configured at least in part in the form of a flat welding seam on an end face.

According to another feature of the present invention, the wound metal strip may have a substantially U-shaped profile in cross section. As an alternative, the wound metal strip may have a substantially V-shaped profile in cross section, defined by a bending radius at the interior side of the bending of less than 0.8. mm. Currently preferred is a bending radius of less than 0.1 mm.

According to another feature of the present invention, the turns define crests and valleys, wherein each crest and each valley is defined by an axial dimension, wherein a ratio of the axial dimension of the crests to the axial dimension of the valleys is smaller than 1. Suitably, the ratio of the axial dimension of the crests to the axial dimension of the valleys is smaller than 0.9. Currently preferred is a ratio of smaller than 0.85. The axial dimensions are hereby measured from the mean radius between inner radius and outer radius, when the diaphragm bellows is relaxed.

According to another feature of the present invention, the metal strip may have corrugated flanks in cross section. Suitably, the corrugation for both flanks extends in the same direction to enable the flanks to substantially bear upon one another without interstices, when the diaphragm bellows is compressed. The corrugation provides the flanks with a certain radial flexibility.

As the term "bellows" indicates, a diaphragm bellows according to the present invention has a land height, i.e. the distance between maximum outer radius (top land) and minimum inner radius (bottom land), which is fairly great. Typically, the land height may lie in a range of 5% to 30% of the inner diameter of the tube. When related to the material thickness of the metal strip, the land height may be at least in a range of ten times to twenty times the material thickness.

According to yet another aspect of the present invention, a method of making a wound metal tube includes the steps of roll forming a metal strip on a spiral path; and winding the roll-formed metal strip to form a tube. The tube may hereby have a bellows-like geometry, or may be a flexible tube.

According to another feature of the present invention, neighboring turns of the wound metal strip may be welded during or after the winding step.

By roll forming along a spiral-shaped path, the cross sectional profile of the metal strip as well as the flexure of the metal strip in its length axis is produced in alternatingly successive incremental steps. Unlike conventional techniques, which produce the end contour of the flat strip first before rounding, roll forming along a spiral-shaped path allows realization of greater deformation degrees. As a result, the flexible tube can be rounded in alternating steps with the development of the profile so that the factor limiting the attainable smallest radius of curvature, the radial height of the profile can be shifted to smaller diameters or to greater profile heights.

According to another feature of the present invention, the metal strip may be pre-profiled before the roll forming step so that an already pre-formed contour enters the spiral-shaped path.

According to yet another aspect of the present invention, an apparatus for making a wound metal tube includes forming units which are arranged on a spiral-shaped path for roll forming and winding a metal strip.

According to another feature of the present invention, a welding device may be provided for welding neighboring turns of the wound metal strip. The welding device may be a laser device, a resistance welding device, a TIG (tungsten-inert gas) welding device, or a microplasma welding device. Combinations of two of the listed welding devices are also feasible to attain better process results in the event of high welding speeds because the regions to be welded undergo preheating before entering the welding zone.

According to another feature of the present invention, at least one of the forming units includes three forming rolls. Such a forming unit is able to profile the metal strip, i.e. to bend it in transverse axis, and to wind, i.e. to bend in the length axis, in one step.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
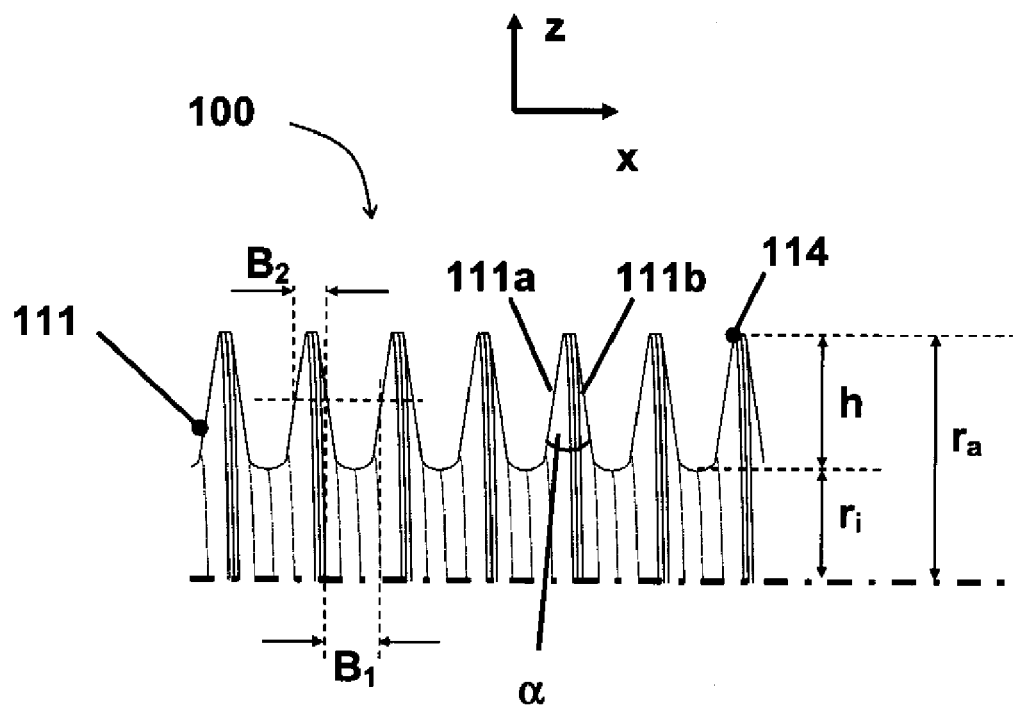
FIG. 1 is a side view of an upper half of a diaphragm bellows according to the present invention having a U-shaped pre-profiled metal strip.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
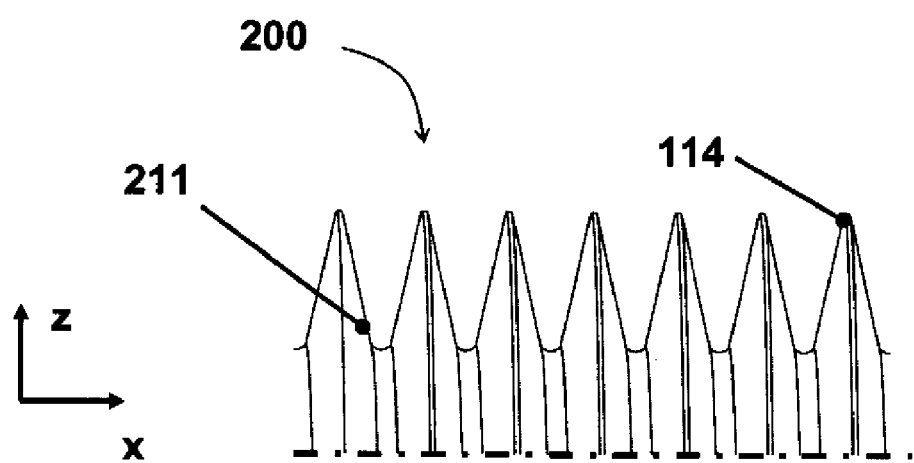
FIG. 2 is a side view of an upper half of a diaphragm bellows according to the present invention having a V-shaped pre-profiled metal strip.
Figure 3:
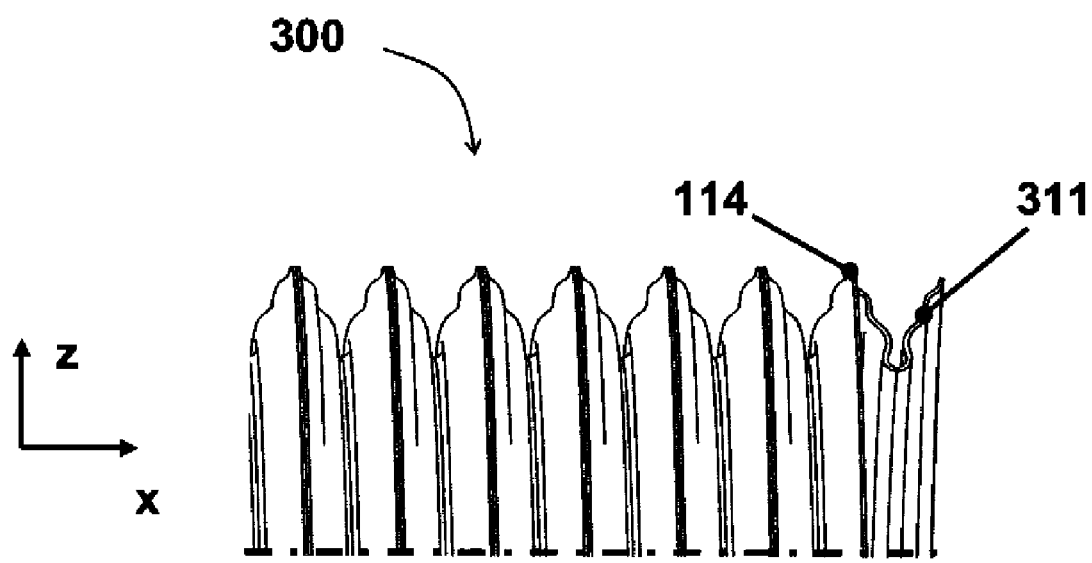
FIG. 3 is a side view of an upper half of a diaphragm bellows according to the present invention having a profiled metal strip with corrugated flanks as mirror images.

Turning now to the drawing, and in particular to FIG. 1, there is shown a side view of an upper half of a spiral-wound diaphragm bellows according to the present invention, generally designated by reference numeral 100 and made from a U-shaped sheet metal strip 111. FIGS. 2 and 3 show variations of diaphragm bellows according to the present invention, with FIG. 2 showing a diaphragm bellows 200 which is made from a V-shaped sheet metal strip 211, and with FIG. 3 showing a diaphragm bellows 300 which is made from a corrugated sheet metal strip 311. For convenience and sake of simplicity, much of the following description is made only in relation to the diaphragm bellows 100, but it will be understood by persons skilled in the art that the diaphragm bellows 200, 300 generally follow the concepts outlined here.

The outer perimeter of the metal strip 111 has a helical profile, wherein the helical line has a pitch which corresponds to the width of the U-shaped metal strip 111.

When the diaphragm bellows 100 is relaxed, neighboring flanks 111a, 111b of the metal strip 111 extend at a small angle $\alpha$ which typically ranges between 10° and 30° in the region of the maximum outer perimeter, where they normally are in flat contact. When the diaphragm bellows 100 is compressed axially, the flanks 111a, 111b can thus position themselves in substantial parallel relationship so that the volume between the flanks 111a, 111b approaches zero.

The deepest point of the diaphragm bellows profile is located at the inner diameter of the diaphragm bellows 100. The welding seam that is formed at this point in conventional diaphragm bellows can now be omitted and is replaced by a metal sheet fold. Located on the outer diameter of the diaphragm bellows 100 is a helical joint 114 between neighboring turns of the U-shaped metal strip 111, thereby allowing the manufacture of the diaphragm bellows 100 by way of a continuous welding operation.

The land height h of the diaphragm bellows 100, i.e. the distance between its outer radius $r_a$ (top land) and its inner radius $r_i$ (bottom land), ranges between 10% and 60% of the inner radius $r_i$. Related to the metal sheet thickness s and applying the conventional manufacturing process sequence of profiling and rounding, the land height h is generally governed by the formula $h \geq 20\,s$. In other words, the land height h is at least 10 mm, when the metal sheet thickness s is 0.5 mm.

A further characteristic of the tube geometry is the dimensioning of the wave crests in relation to the wave valleys. As shown in FIG. 1, the wave crests have an axial width $B_2$ which is smaller than the axial width $B_1$ of the wave valleys. The ratio of $B_2:B_1$ may be smaller than 0.9. Currently preferred is a ratio of 0.85. The respective widths are hereby measured between the points where the flanks 111*a* and 111*b* intersect the mean radius $(r_a + r_i)/2$ between inner radius $r_i$ and outer radius $r_a$.

Figures 4, 5:
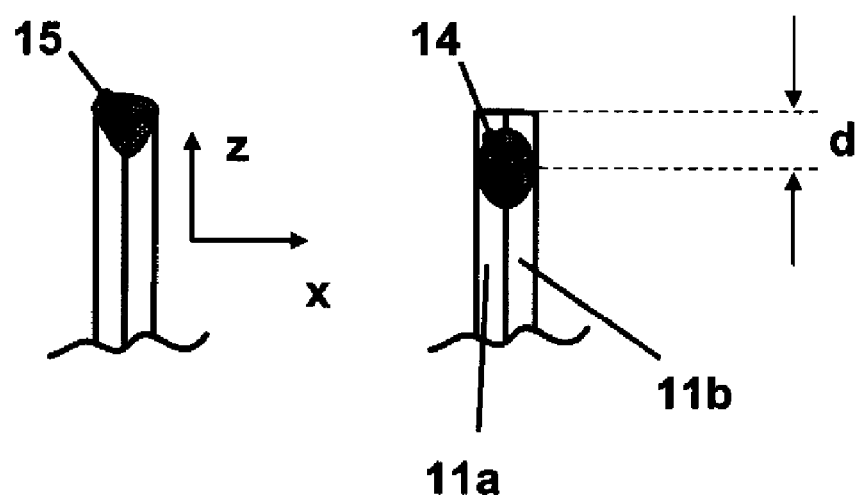
FIG. 4 is a schematic illustration of a flat seam on an end face.
FIG. 5 is a schematic illustration of a radially inwardly positioned welding seam.

As shown in FIG. 4, the spiral-wound metal bellows may have a typical flat welding seam 15 on an end face between abutting flanks of neighboring strip turns. An alternative is shown in FIG. 5 which depicts the application of a welding seam 14 between abutting flanks 11*a*, 11*b* of neighboring strip turns just shy of the greatest outer diameter, i.e. typically at a distance d of about 0.5 mm to 2 mm. The seam 14 may be produced, for example, by laser-assisted welding, in which the flanks 11*a*, 11*b* to be joined are welded axially from outside, i.e. in x-direction, rather than radially in z-direction. An apparatus for positioning the flanks to be joined is hereby situated tangentially to the structure and may execute an oscillating motion in axial direction to the structure during the welding operation. This type of welding can be carried out substantially stationarily. There is no need for precise positioning of the flanks relative to one another, when welding axially below the greatest outer diameter of the rotating component, thereby enhancing process stability. The metal strip 111 may, optionally, also welded on the outer diameter by resistance welding, or combinations of TIG welding and laser welding, which can be applied axially in relation to the structure in the absence of added material.

Figure 6:
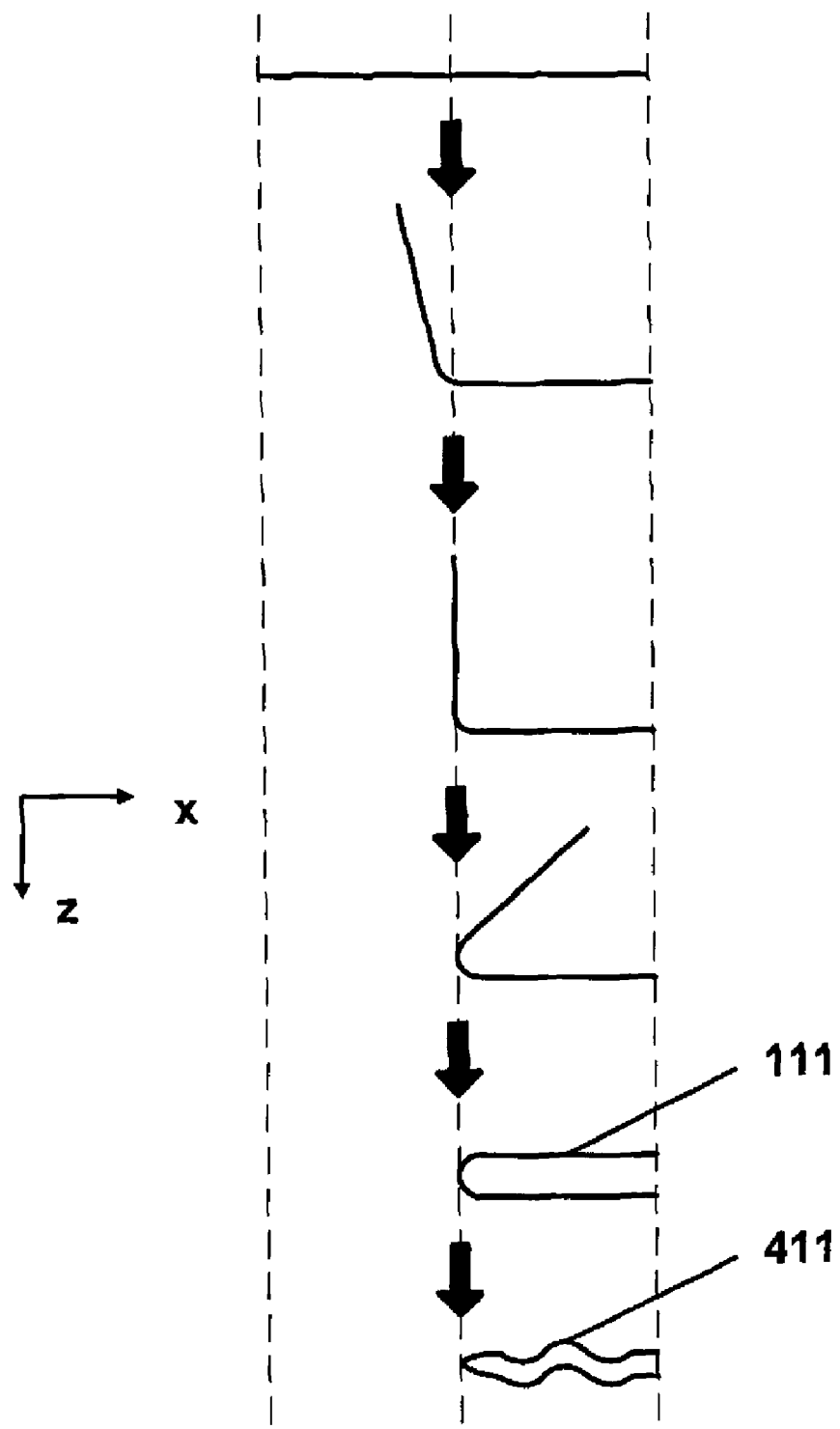
FIG. 6 is a schematic illustration of successive process steps to profile a corrugated metal strip, in cross section through the metal strip.

Turning now to FIG. 6, there is shown a schematic illustration of successive process steps to profile the metal strip 111. Profiling may be terminated when the metal strip 111 has a U-shaped profile or may be continued to produce a profile 411 with corrugated flanks. As the flanks have a corrugation in a same direction, they can abut one another, when the diaphragm bellows is compressed. It is possible to bend the metal strip 111 in length direction of the metal strip 111 between the illustrated profiling steps, i.e. bending in transverse direction of the metal strip 111 so as to realize a winding.

Figure 7:
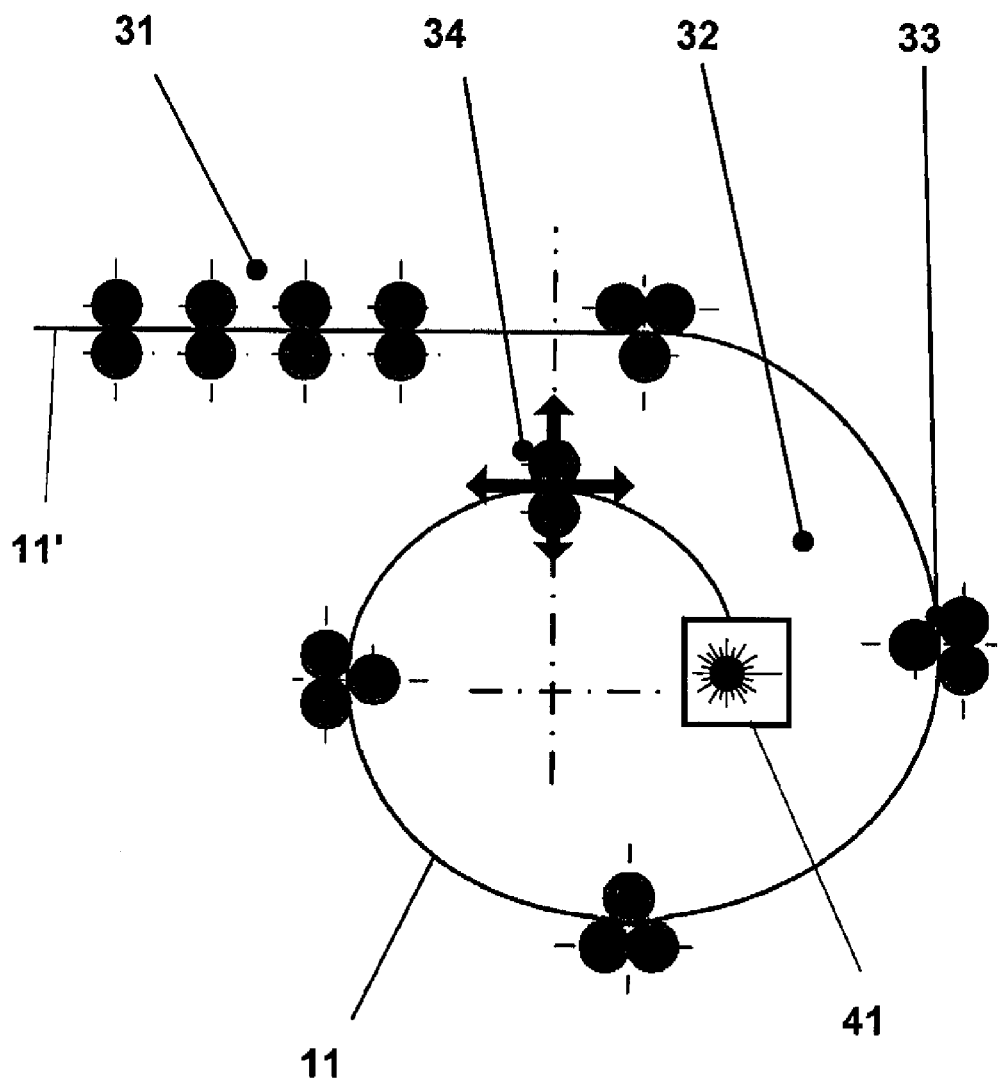
FIG. 7 is a schematic side view of an apparatus for manufacturing a diaphragm bellows according to the present invention.

FIG. 7 shows a schematic side view of an apparatus for manufacturing a diaphragm bellows according to the present invention. Starting material for making a spiral-wound diaphragm bellows is a flat strip material 11' which may be made of special steel. The strip 11' is pre-shaped by a planar roll-forming unit 31 having several passes. This roll forming operation is generally known to the artisan and is, for example, the subject matter of DIN (German Industrial Norm) 8586. The roll forming operation is followed by a second roll forming operation 32 in which the profile cross section of the pre-shaped strip is alternately formed on a spiral-shaped path so as to reduce the diameter of the emerging winding. Unlike the planar roll forming unit 31 which has a top roll and a bottom roll, the individual forming stations 33 along the spiral-shaped path include three forming rolls which are fixedly arranged on individual positions of the spiral-shaped path. Two of the three forming rolls are hereby positioned to the outside, whereas the third forming roll is positioned on the inside. Three forming rolls are required to produce the curvature like in a three-roll bending machine. The last roll forming unit 34 at the exit side of the spiral-shaped path subjects the strip material 11 to the final pass and has two rolls which are not fixed in place but adjustable in at least two coordinate axes to be able to fine-tune the curvature and pitch.

The alternating formation of the profile and realization of greater curves is required in particular when manufacturing diaphragm bellows geometries in which the ratio of radial land height h to metal sheet thickness s is greater than 30. In these cases, the lands cannot be formed entirely on the flat strip 11' and then rounded because the metal sheet folds in the area of the inner diameter or because constrictions form at the outer diameter that can cause rupture of the material or an unwanted reduction of the metal sheet thickness.

The combined roll forming and rounding operations of the profile (stations 31, 32) on a spiral-shaped path results in the formation of a metal strip 11 of a configuration shown in FIGS. 1, 2, 3 and sized and curved appropriately. The metal strip 11 is then transferred to a stationary welding device 41 to produce a helical welding seam axially on the structure, suitably just shy of the greatest outer diameter as shown in FIG. 5.

It will be understood by persons skilled in the art that the welding operation of a wound and profiled metal strip may equally be implemented at the inner diameter. Also, in addition to the manufacture of spiral-wound diaphragm bellows made of special steel, structures of conventional steel as well as nonferrous metals can be made in a same manner. The concept of the spiral-wound diaphragm bellows and the described continuous process for making a spiral-wound diaphragm bellows results in a significant reduction of manufacturing costs so that new uses can be contemplated in addition to conventional applications. For example, a diaphragm bellow according to the present invention may be used for flexible pipe elements in exhaust systems of motor vehicles.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A diaphragm bellows, comprising a spiral-wound, pre-profiled metal strip having neighboring turns connected by a continuous welding seam in an area of an outer diameter or inner diameter of the metal strip, wherein neighboring flanks of the metal strip enter a region of the welding seam at an angle of less than 60°.

2. The diaphragm bellows of claim 1, wherein the angle is less than 45.

3. The diaphragm bellows of claim 1, wherein the angle is less than 30.

4. The diaphragm bellows of claim 1, wherein the welding seam is radially spaced in midsection at a distance of at least about 0.5 mm from the outer diameter or inner diameter.

5. The diaphragm bellows of claim 4, wherein the distance is about 1 mm.

6. The diaphragm bellows of claim 1, wherein the metal strip has a substantially U-shaped profile in cross section.

7. The diaphragm bellows of claim 1, wherein the metal strip has a substantially V-shaped profile in cross section, defined by a bending radius of less than 0.8. mm.

8. The diaphragm bellows of claim 7, wherein the bending radius is less than 0.1. mm.

9. The diaphragm bellows of claim 1, wherein the turns define crests and valleys, each said crest and each said valley being defined by an axial dimension, wherein a ratio of the axial dimension of the crests to the axial dimension of the valleys is smaller than 1.

10. The diaphragm bellows of claim 9, wherein the ratio of the axial dimension of the crests to the axial dimension of the valleys is smaller than 0.9.

11. The diaphragm bellows of claim 9, wherein the ratio of the axial dimension of the crests to the axial dimension of the valleys is smaller than 0.85.

12. The diaphragm bellows of claim 1, wherein the metal strip has corrugated flanks in cross section.

13. The diaphragm bellows of claim 12, wherein the corrugation of the flanks extends in a same direction.

14. The diaphragm bellows of claim 1, wherein the continuous welding seam is configured at least in part in the form of a flat welding seam on an end face.

15. The diaphragm bellows of claim 1, wherein the metal strip defines a land height which is commensurate with a distance between a top land and a bottom land of the metal strip, said land height ranging from 5% to 30% of the inner diameter of the metal strip.

16. The diaphragm bellows of claim 15, wherein the land height is at least ten times to twenty times a material thickness of the metal strip.

17. A diaphragm bellows, comprising a spiral-wound profiled metal strip having neighboring turns connected by a continuous welding seam in an area of an outer diameter or inner diameter of the metal strip, wherein the welding seam is radially spaced in midsection at a distance of at least about 0.5 mm from the outer diameter or inner diameter.

* * * * *